Patented Nov. 17, 1942

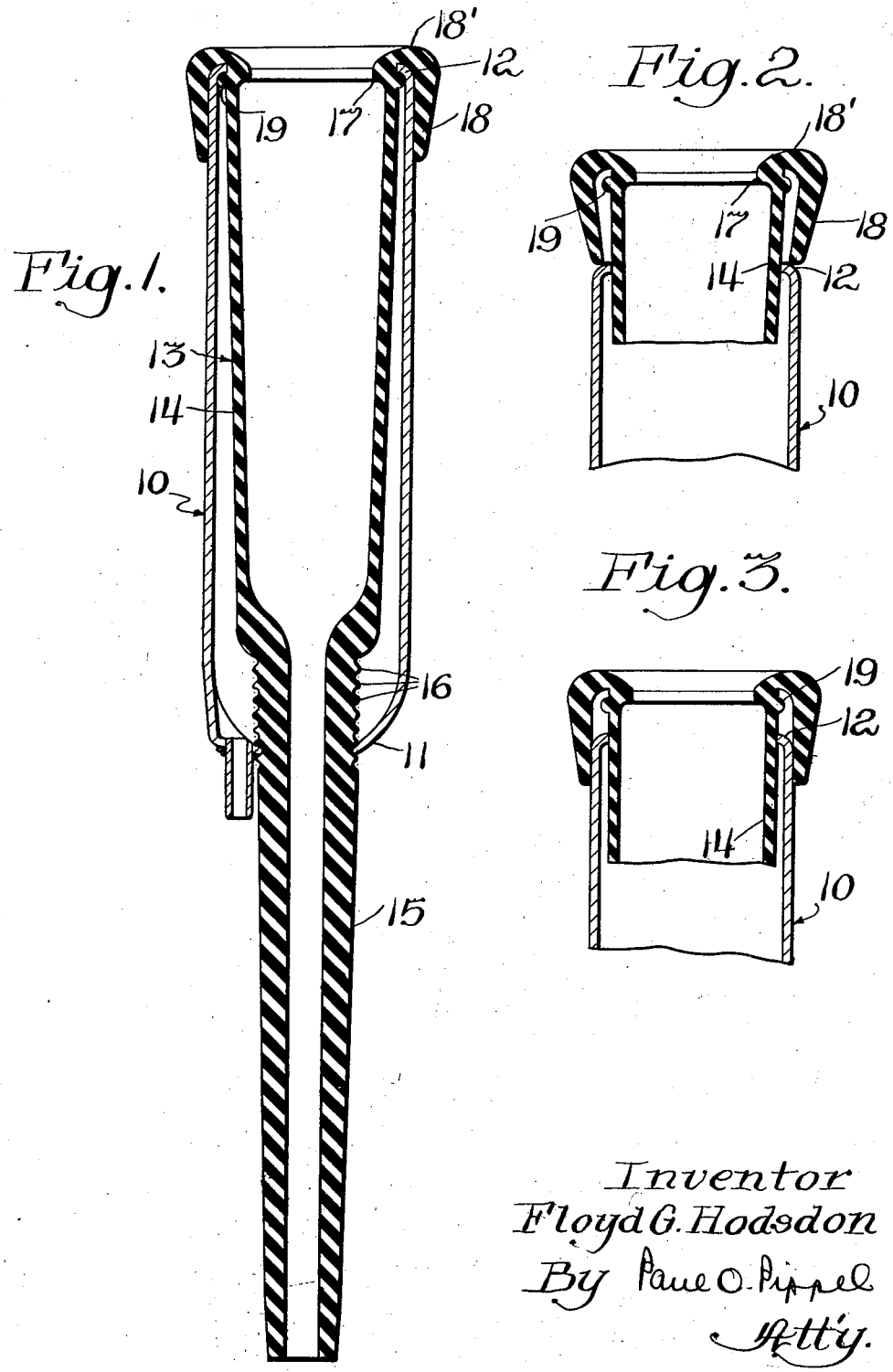

2,302,443

UNITED STATES PATENT OFFICE 2,302,443

TEAT-CUP CONSTRUCTION

Floyd G. Hodsdon, Milwaukee, Wis., assignor to International Harvester Company, a corporation of New Jersey Application February 28, 1940, Serial No. 321,195

4 Claims. (Cl. 31—85)

This invention relates to a teat cup construction.

In the patent to Hodsdon 1,955,810, dated April 24, 1934, there is shown a teat cup assembly comprising a metallic shell having an outwardly extending flange at one end and a rubber lining member fitted within the shell. The present construction has been devised to overcome certain inherent disadvantages in the use of an outwardly extending flange on the metallic shell.

An object of the present invention is the provision of an improved teat cup construction.

A further object is to provide a teat cup assembly of relatively small outer diameter.

Another object is the provision of a teat cup construction in which the metallic shell may be conveniently and easily assembled with the rubber lining or inflation member.

According to the present invention, the metallic shell of a teat cup assembly is provided with an inwardly extending radial flange at one end. The rubber lining, commonly referred to as an "inflation" member, adapted to fit within the shell, has a bead which lies within the flange and a cylindrical extension which embraces the portion of the shell, adjacent the flange.

In the drawing,

Figure 1 shows the novel teat cup assembly of the present invention in section; and Figures 2 and 3 show sectional views of stages in the assembly of the parts of the teat cup assembly.

As shown in Figure 1, a cylindrical shell 10 has a reduced portion 11 at one end and an inwardly extending radial flange 12 at the other end having a small uniform inside radius where it joins the shell. Fitting within the shell 10 is a rubber lining or inflation 13 having a portion 14 of relatively large inner and outer diameters, and a portion 15 of relatively small inner and outer diameters extending from the shell and having a series of external ribs 16, the space between any two of which the reduced portion 11 of the shell 10 engages. The end of the lining adjacent the flange 12 has an inturned lip 17 of reduced diameter and a reversed cylindrical extension 18 embracing the outer portion of the shell adjacent the flange 12 integrally joined to the portion 13 of the lining by a curved portion 18'. The lining 13 also has an outwardly projecting bead 19 spaced from the inner surface of the curved portion 18' a distance equal to the thickness of the shell 10, which fits within the flange 12.

Figure 1 shows the shell 10 and the inflation 13 in assembled position ready for use. In use, a cow's teat is sucked into the lining 13 by means of vacuum. The lip 17 is the dividing line between the atmospheric pressure outside and the part of the teat under vacuum inside the liner, and milking is effected by vacuum. The movement of the portion 14 of the lining against and away from the teat by means of air and vacuum alternately applied to the space between the shell 10 and the lining 13 massages the teat and thus keeps the blood circulating in the fleshy part of the teat exposed to vacuum that is below the lip 17.

It is desirable to have the largest diameter of the teat cup assembly, that is, the outside diameter of the cylindrical extension 18, as small as conveniently possible, since the teats on some cows may be relatively close together. With the use of an inwardly extending flange 12 on the shell 10, the smallest outside diameter of the extension 18 for a given inside size of the lining 13 is obtained. With an outwardly extending flange, such as shown in the aforementioned Hodsdon patent, the outside diameter of the extension 18 would have to be considerably larger, or the thickness of the extension immediately adjacent the outwardly extending flange would be so thin that tearing of the extension, or cutting by being bumped against hard surfaces, might occur at this point.

Another advantage of the use of an inwardly extending shell flange lies in the ease of assembly of the lining within the casing. Figures 2 and 3 illustrate stages in the assembly. Figure 2 shows the inwardly extending flange of the shell about to enter the space between the portion 14 of the lining and the cylindrical extension 18. Since the outside of the flange 12 is curved, the extension 18 is easily expanded to permit entry of the shell in the space between the portion 14 of the lining and the cylindrical extension 18. Figure 3 shows the shell and the lining just prior to movement of the flange 12 into engagement with the lip or bead 19. By use of the bead 19, which is rounded on its outer surface, an easy passage of the flange 12 up into its position in engagement with the bead is possible. The connections at the top of the annular recess provided between the inflation 13 and the cylindrical extension 18 are formed when molding to fit the inside and outside curvatures of the flange 12.

It will be apparent from the foregoing description that a new and novel teat cup construction has been provided. It is the intention to limit the scope of the invention only within the scope of the appended claims.

What is claimed is:

1. In a teat-cup construction, an inflexible casing having an inturned flange at one end, and a flexible lining within the casing fitting closely within the flange and the portion of the casing immediately adjacent thereto throughout the entire peripheral extent of the flange and the said portion, said lining having an extension embracing the exterior of the portion of the casing opposite the inturned flange as far as a point somewhat spaced below the flange, the exterior of the portion of the casing embraced by the extension of the lining being devoid of external projections.

2. In a teat-cup construction, an inflexible casing having an inturned flange at one end, and a flexible lining fitting within the casing and having a bead closely fitting within the flange, and an extension embracing the exterior of the portion of the casing opposite the flange to a point somewhat spaced below the flange, the exterior of the portion of the casing embraced by the extension of the lining being devoid of external projections.

3. In a teat-cup construction, a rigid shell having an annular inturned flange at one end having a concave inner surface, and a resilient inflation member having a lining portion within the shell, said lining being provided at the flanged end of the shell with a curved portion extending outwardly over the flange in contact therewith, and an integral extension embracing the exterior of the shell opposite the flange to a point somewhat spaced below the flange, the exterior of the portion of the shell embraced by the lining being devoid of external projections.

4. In a teat-cup construction, a rigid shell having an annular inturned flange at one end having a concave inner surface and said shell having an opening at the other end, and a resilient inflation member having a lining portion within the shell spaced therefrom and a tubular connection extending through the opening in the shell, said lining being provided at the flanged end of the shell with a curved portion extending outwardly over the flange in contact therewith, an extension embracing the exterior of the shell opposite the flange to a point somewhat spaced below the flange, and an outwardly extending bead having a curved surface adapted to fit inside the concave inner surface of the flange in contact therewith, the exterior of the portion of the shell embraced by the extension of the lining being devoid of external projections.

FLOYD G. HODSDON.